United States Patent
Stieglitz et al.

(10) Patent No.: US 11,642,927 B2
(45) Date of Patent: May 9, 2023

(54) CHASSIS LINK FOR A MOTOR VEHICLE

(71) Applicant: ZF FRIEDRICHSHAFEN AG, Friedrichshafen (DE)

(72) Inventors: Andre Stieglitz, Osnabrück (DE); Manfred Bürgmann, Ravensburg (DE); Ingolf Müller, Minfeld (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 85 days.

(21) Appl. No.: 17/414,657

(22) PCT Filed: Nov. 15, 2019

(86) PCT No.: PCT/EP2019/081419
§ 371 (c)(1),
(2) Date: Jun. 16, 2021

(87) PCT Pub. No.: WO2020/126247
PCT Pub. Date: Jun. 25, 2020

(65) Prior Publication Data
US 2022/0048349 A1 Feb. 17, 2022

(30) Foreign Application Priority Data
Dec. 17, 2018 (DE) ...................... 10 2018 221 892.7

(51) Int. Cl.
*B60G 7/00* (2006.01)

(52) U.S. Cl.
CPC .......... *B60G 7/001* (2013.01); *B60G 2206/11* (2013.01); *B60G 2206/7101* (2013.01); *B60G 2206/8105* (2013.01); *B60G 2206/821* (2013.01)

(58) Field of Classification Search
CPC ..................................................... B60G 7/001
See application file for complete search history.

(56) References Cited

U.S. PATENT DOCUMENTS 4,753,456 A * 6/1988 Booher ................. B60G 7/001
280/124.152
11,173,763 B2 * 11/2021 Stieglitz ............ B29C 66/12441
(Continued)

FOREIGN PATENT DOCUMENTS

| DE | 102016211212 | 12/2017 |
| DE | 102017207164 | 10/2018 |
| EP | 2722533 | 4/2014 |

OTHER PUBLICATIONS

Https://www.transmissiondigest.com/the-proper-surface-finish-for-bonding-an-eye-opener/ (Year: 2006).*
(Continued)

*Primary Examiner* — Paul N Dickson
*Assistant Examiner* — Shams Dhanani
(74) *Attorney, Agent, or Firm* — Cozen O'Connor (57) ABSTRACT

A chassis link for a motor vehicle having load introduction elements connected by a straight profile portion of fiber-reinforced plastic. The profile portion and load introduction elements are connected via an adhesive connection in a common connection portion in which an end portion of the load introduction element and an end portion engage another in positive engagement. On both sides of a profile portion neutral fiber plane, the adhesive connection has longitudinal adhesive layers extending in a longitudinal direction of the profile portion and parallel to one another in a vertical. In vertical direction of the profile portion the longitudinal adhesive layers have a cross-sectional area becoming larger with increasing distance from the neutral fiber plane so that a relief is brought about in regions of the adhesive connection which have a relatively large distance from the neutral fiber plane in vertical direction of the profile portion.

15 Claims, 6 Drawing Sheets

(56) References Cited

U.S. PATENT DOCUMENTS

| | | | |
|---|---|---|---|
| 11,298,898 B2* | 4/2022 | Lobo Casanova | B29C 70/50 |
| 11,298,997 B2* | 4/2022 | Stieglitz | B60G 7/001 |
| 2014/0112708 A1* | 4/2014 | Carrere | F16B 11/008 |
| | | | 156/303.1 |
| 2016/0167471 A1* | 6/2016 | Hudler | B60G 7/001 |
| | | | 280/124.125 |
| 2020/0139776 A1* | 5/2020 | Rupflin | B29C 66/524 |
| 2021/0316584 A1* | 10/2021 | Stieglitz | F16C 7/026 |

OTHER PUBLICATIONS

Office Action dated Dec. 23, 2021 issued in German Patent Application No. 102018221892.7.

* cited by examiner

CHASSIS LINK FOR A MOTOR VEHICLE

CROSS REFERENCE TO RELATED APPLICATIONS

This is a U.S. national stage of Application No. PCT/EP2019/081419 filed Nov. 15, 2019. Priority is claimed on German Application No. DE 10 2018 221 892.7 filed Dec. 17, 2018 the content of which is incorporated herein by reference.

BACKGROUND OF THE INVENTION

1. Field of the Invention

The disclosure is directed to a chassis link for a motor vehicle having at least two load introduction elements fixedly connected to one another by a straight profile portion comprising a fiber-reinforced plastic.

2. Description of Related Art

Chassis links for motor vehicles having at least two load introduction elements fixedly connected to one another by a straight profile portion comprising a fiber-reinforced plastic are known from the prior art.

An axle strut that has two load introduction elements comprising a metal material, e.g., aluminum, and a supporting profile comprising a fiber-reinforced plastic composite material connecting the two load introduction elements is known from DE 10 2017 207 164 A1. The connections between the supporting profile and the two load introduction elements are formed as adhesive connections. The two load introduction elements each have two slot-shaped receptacles which each in turn receive a free end of longitudinal profiles of the supporting profile. The slot-shaped receptacles and the free ends of the longitudinal profiles engage in one another mutually and substantially in positive engagement. The adhesive connections have two longitudinal adhesive layers at each end of the supporting profile and on both sides of a neutral fiber plane extending in longitudinal direction of the supporting profile. Accordingly, there are four longitudinal adhesive layers at each of the two ends of the supporting profile. These four longitudinal adhesive layers are arranged parallel to one another in each instance. Each of the total of eight longitudinal adhesive layers of the axle strut is formed substantially planar in itself and has the same length in longitudinal direction of the supporting profile. In a vertical direction extending perpendicular to the longitudinal direction of the supporting profile, the longitudinal adhesive layers have substantially identical thickness in a central portion. However, in a base remote of the supporting profile and in a runout facing the supporting profile, the slot-shaped recesses are formed somewhat open so that the longitudinal adhesive layers are somewhat thicker in these locations. The total of eight longitudinal adhesive layers of the axle strut are geometrically identical.

Investigations have shown that stresses of various magnitudes occur with respect to the tensile load of the axle strut within the adhesive connection with its longitudinal adhesive layers of substantially identical thickness. In this context, it was possible to verify through tests that there is a relationship between the stresses occurring in the individual longitudinal adhesive layers and the distance of the longitudinal adhesive layers from the neutral fiber plane. Accordingly, the stress in the longitudinal adhesive layers tends to increase with increasing radial distance away from the neutral fiber plane. Particularly when the supporting profile is outwardly engaged by teeth of the load introduction element as is shown in FIG. 5 of DE 10 2017 207 164 A1, a shear stress occurs in the longitudinal adhesive layer between an outer tooth of this kind and the associated outer circumferential surface of the supporting profile, which shear stress is substantially higher than a shear stress occurring in an adjacent longitudinal adhesive layer which is spaced apart in parallel and located closer to the neutral fiber plane. As a consequence, the adhesive connection between the supporting profile and the metal load introduction element is loaded unevenly, which can trigger a premature failure of the axle strut.

SUMMARY OF THE INVENTION

It is an object of one aspect of the invention to provide a chassis link for a motor vehicle formed as a lightweight component at least partially comprising fiber-reinforced plastic and by which, at the same time, relatively high forces can be transmitted over a relatively long life.

Accordingly, one aspect of the invention provides a chassis link for a motor vehicle. The chassis link has at least two load introduction elements fixedly connected to one another by a straight profile portion made from a fiber-reinforced plastic. The profile portion and at least one of the two load introduction elements are connected to one another via an adhesive connection in a common connection portion in which an end portion of the load introduction element and an end portion of the profile portion engage in one another mutually and substantially in positive engagement. On both sides of a neutral fiber plane of the profile portion, the adhesive connection has at least two longitudinal adhesive layers which are at least substantially planar in themselves and identical in length and which extend in a longitudinal direction of the profile portion and which are, at the same time, spaced apart parallel to one another in a vertical direction of the profile portion extending perpendicular to the longitudinal direction. According to the invention, at least two of the longitudinal adhesive layers have, considered in vertical direction of the profile portion, on both sides of the neutral fiber plane a cross-sectional area becoming larger with increasing distance from the neutral fiber plane of the profile portion so that, with respect to a tensile load of the chassis link, a relief is brought about in regions of the adhesive connection which have a relatively large distance from the neutral fiber plane in vertical direction of the profile portion.

Conversely, at least two of the longitudinal adhesive layers have on both sides of the neutral fiber plane a cross-sectional area becoming smaller with decreasing distance from the neutral fiber plane of the profile portion. In this way, supporting components of the adhesive connection are shifted toward the neutral fiber plane and therefore, at the same time, regions of the adhesive connection having a relatively large distance from the neutral fiber plane in vertical direction of the profile portion are relieved. In particular, an adhesive material of the longitudinal adhesive layers has a smaller stiffness and, at the same time, a relatively high elastic stretchability relative to the profile portion comprising fiber-reinforced plastic and relative to the material of the load introduction element. With this insight, the flux of force inside the adhesive connection can be selectively influenced and adjusted by varying the thickness of the longitudinal adhesive layers during a tensile loading of the chassis link in longitudinal direction of the profile portion during which primarily shear stresses occur inside of the longitudinal adhesive layers. In this way, a uniform distribution of stresses can be achieved inside of the adhesive connection when the chassis link is under load, particularly under tensile load. At the same time, local stress peaks can be prevented within the adhesive connection. The loadability and, at the same time, also the life of the adhesive connection and therefore also the loadability and life of the chassis link is increased in this way. In particular, the longitudinal adhesive layers considered along the extension thereof in longitudinal direction of the profile portion at least partially have a varying thickness.

In particular, the longitudinal direction of the profile portion is identical to a longitudinal direction of the connection portion. A load introduction element as meant herein is an element which is operatively connected to the profile portion and can introduce operating loads, for example, tensile forces and/or compressive forces, into the profile portion. In particular, the end portion of the load introduction element and the end portion of the profile portion form free ends of the load introduction element and of the profile portion, respectively. The load introduction element can be part of an articulated bearing support of the chassis link or, alternatively, can serve to connect two or more profile portions or can be part of an articulated bearing support of the chassis link and can serve simultaneously for connecting two or more profile portions.

Within the context of one aspect of the present invention, a profile portion is a portion of a continuous profile. In particular, the straight profile portion is formed as a profile portion that is symmetrical in cross section. The symmetry can refer to one plane of symmetry or to more than one plane of symmetry. When the symmetry refers to two planes of symmetry, the latter are in particular oriented perpendicular to one another when the profile portion is viewed in section. In particular, the profile portion has a cross-sectional geometry, which can be circumscribed by a square at least substantially touching outer surfaces thereof. As has already been stated, the longitudinal adhesive layers are longitudinal adhesive layers which are, in themselves, at least substantially planar. This aspect is important for the present invention because the irregular stress distribution described above does not occur, or does not occur in the manner described above, in curved longitudinal adhesive layers, for example, in an adhesive connection with round pipes. The reason for this is that curved longitudinal adhesive layers can be supported at component part adhesive surfaces which are likewise curved and which have a certain contour stiffness in contrast to planar component part adhesive surfaces.

As meant herein, the neutral fiber plane designates the totality of all points within the straight profile portion and within the load introduction element in which no tensile stresses or compressive stresses occur during a bending of the straight profile portion and of the load introduction element. In other words, the neutral fiber plane within the straight profile portion and within the load introduction element is a layer plane that is neither stretched nor compressed when the chassis link is acted upon by a bending load and, accordingly, the longitudinal extension thereof also does not change. In particular, longitudinal adhesive layers which are arranged in a mirror-inverted manner with respect to the neutral fiber plane and which have in each instance the same distance from the neutral fiber plane are formed geometrically identical. In particular, the neutral fiber plane at the same time constitutes a symmetry plane with respect to the geometric construction of the chassis link.

As has already been stated, the profile portion is formed straight. Therefore, within the framework of one aspect of the present invention, a straight profile portion is always meant even when this is not explicitly stated. In particular, the profile portion has a constant cross-sectional geometry along its longitudinal extension. In particular, the straight profile portion comprising a fiber-reinforced plastic is a pultruded profile portion, i.e., is produced in a pultrusion process. The pultrusion process is a method for low-cost production of fiber-reinforced plastic profiles in a continuous operation. In particular, the profile portion has reinforcing fibers, which are distributed over the entire profile cross section and which extend in a longitudinal profile direction, which brings about a high stiffness and strength in this direction. To configure the profile portion against kinking and/or bulging, relatively high proportions of drawn fibers are advantageously arranged in edge regions of the profile cross section so as also to run in longitudinal profile direction at the same time. In particular, all of the fibers are oriented in longitudinal direction of the profile portion. In a preferred embodiment form, the profile portion has a fiber volume content of approximately 65 percent in order to achieve high stiffness in longitudinal direction of the profile and a high bending resistance at the same time. Generally, a fiber volume content of between 50 percent and 75 percent is possible.

Carbon fibers, glass fibers, aramid fibers or natural fibers embedded in a plastic matrix can be used in the profile portion. The matrix system advantageously comprises a vinyl ester resin because the latter can be processed favorably in the pultrusion method with very good chemical and mechanical properties. In addition, vinyl ester resin has good adhesion in combination with some important adhesives. Alternatively, an epoxy resin, a polyester resin, phenol resin or polyurethane resin can be used as matrix material. The adhesive connection has, in particular, epoxy adhesive. Alternatively, other adhesives such as methyl methacrylate adhesives, for example, can also be used. The load introduction element can be part of an articulated bearing support of the chassis link or, alternatively, can serve to connect two or more straight profile portions or can be part of an articulated bearing support of the chassis link and serve simultaneously for connecting two or more profile portions. The load introduction element is preferably made of metal, particularly a light metal. The load introduction element is advantageously made of aluminum or an aluminum alloy, particularly an aluminum alloy with good cutting characteristics and/or good extrusion characteristics and/or a high fatigue strength.

Within the framework of one aspect of the present invention, a chassis link is a rod-shaped component part or other component part, which is elongated in one or more spatial directions and is suitable primarily for transmitting forces. The chassis link can be, for example, a two-point link, i.e., a pendulum post, which is also known as a roll restrictor and is provided at least substantially for transmitting tensile forces and/or compressive forces but not, or only to a limited extent, for transmitting transverse forces and/or torques. The two-point link can be formed, for example, as an axle strut or as a torque support or as a coupling bar for connecting a roll stabilizer to a vehicle chassis at the ends. The chassis link is acted upon primarily by tensile and/or compressive forces which are introduced into the profile portion via the load introduction element or elements. The chassis link is particularly a built chassis link, i.e., a chassis link composed of a plurality of separately produced individual parts. This mode of construction has the advantage over a one-piece chassis link, for example, that the profile portion can be produced with variable length so that different variants of the chassis link can be realized in a modular manner. In particular, the profile portion has a cross-sectional shape deviating from a circular ring configuration. The profile portion preferably has a non-round cross-sectional shape.

The longitudinal adhesive layers are preferably formed at least partially as outer adhesive layers which are glued to surfaces of the profile portion which have a normal vector that extends in vertical direction of the profile portion and faces away from the profile portion at the same time. All of these outer adhesive layers have a cross-sectional area becoming larger with increasing distance from the neutral fiber plane of the profile portion. This cross-sectional area lies in a plane that extends in longitudinal direction of the profile portion and perpendicular to the neutral fiber plane simultaneously. In this context, a normal vector is a vector orthogonally perpendicular to a surface of the profile portion which is at least substantially planar and provided at the same time with the outer adhesive layer.

A longitudinal adhesive layer arranged between an outer circumferential surface of the end portion of the profile portion and an outer tooth of the load introduction element that partially covers the aforementioned outer circumferential surface advantageously has an increasing thickness in longitudinal direction of the profile portion and toward a free end of the outer tooth over substantially one half of the tooth length in order to prevent a peeling off of the outer tooth from the profile portion under a tensile loading of the chassis link in the region of this longitudinal adhesive layer. In particular, the outer tooth is formed substantially planar in itself. In particular, the outer tooth has a decreasing thickness along its extension in longitudinal direction of the profile portion and, at the same time, away from the load introduction element. The risk of a peeling off under tensile loading of the chassis link is highest at the free end of the outer tooth when the latter tapers along its longitudinal extension toward a free end.

The profile portion advisably has a cover layer comprising woven fibers. Because of the cover layer comprising woven fibers, a higher ductility and lower stiffness of the outer surface of the profile portion can be achieved compared to the fiber-reinforced plastic material located below it on the profile portion. Owing to the fact that the fiber-reinforced plastic material of the profile portion located under the woven fibers now has a higher stiffness, this fiber-reinforced plastic material makes a greater contribution to a transmission of force than the cover layer comprising woven fibers when the chassis link is loaded, for example, by a tensile force. The extent of the higher ductility and lower stiffness can also be adjusted, inter alia, by the thickness of the woven fibers. In this way, an effect can be brought about similar to that of the sharp increase in the thickness of the longitudinal adhesive layers, particularly of the outer longitudinal adhesive layers which have the greatest distance from the neutral fiber plane perpendicular to the longitudinal direction of the profile portion. With its higher ductility and lower stiffness, the cover layer comprising woven fibers can advantageously be utilized in combination with a varying of the thickness of the longitudinal adhesive layers, particularly of the outer longitudinal adhesive layers, in order to achieve the most uniform possible force transmission inside of the adhesive connection.

In particular, the cover layer is an outer circumferential surface of the profile portion. In particular, the cover layer comprising woven fibers is arranged in a region of the end portion of the profile portion that is covered by an outer tooth of the load introduction element.

According to an advantageous further development of one aspect of the invention, the profile portion has a second neutral fiber plane that extends in longitudinal direction of the profile portion and which is simultaneously oriented perpendicular to the neutral fiber plane, wherein the adhesive connection has on both sides of the second neutral fiber plane at least two longitudinal adhesive layers that are, in themselves, at least substantially planar and identical in length and which extend in longitudinal direction of the profile portion and are simultaneously spaced apart parallel to one another in a transverse direction of the profile portion extending perpendicular to the longitudinal direction and perpendicular to the vertical direction, and wherein, on both sides of the second neutral fiber plane, at least two of these longitudinal adhesive layers in each instance have a cross-sectional area becoming larger with increasing distance from the second neutral fiber plane of the profile portion considered in transverse direction of the profile portion. During a tensile loading of the chassis link, a configuration of this kind further relieves the adhesive connection, specifically in regions of the adhesive connection which are at a relatively large distance from the second neutral fiber plane in transverse direction of the profile portion. In particular, the second neutral fiber plane is simultaneously a plane of symmetry with reference to the geometric construction of the chassis link.

Transverse adhesive layers that are arranged at the same height in longitudinal direction of the profile portion and are at the same time spaced apart from one another perpendicular to the longitudinal direction of the profile portion and at the same time extend mainly perpendicular to the longitudinal direction of the profile portion advantageously also have, perpendicular to the longitudinal direction of the profile portion, a thickness that increases measured in longitudinal direction of the profile portion with increasing distance from the neutral fiber plane of the profile portion. A uniform transmission of force between an end portion of the load introduction element and an end portion of the profile portion in the connection portion is benefitted by this configuration when the chassis link is under tensile or compressive load.

The longitudinal adhesive layers are preferably at least partially connected to one another by material bond. In particular, all of the longitudinal adhesive layers are connected to one another by material bond. In particular, all of the transverse adhesive layers are connected to one another by material bond via longitudinal adhesive layers. In particular, all of the longitudinal adhesive layers and all of the transverse adhesive layers are connected to one another by material bond.

The end portion of the load introduction element is preferably penetrated in a grid-like manner by through-slots which extend perpendicular to the longitudinal direction of the profile portion and which at least partially intersect at the same time, so that the end portion of the load introduction element has a spline with teeth extending at least substantially in longitudinal direction of the profile portion. Since the through-slots penetrate the end portion of the load introduction element in a grid-like manner, the teeth of the spline make up the remaining material. The stiffness of the end portion of the load introduction element, which is reduced in this way, is advantageous when gluing to the end portion of the straight profile portion. The through-slots preferably intersect at an angle of substantially 90 degrees. In particular, the through-slots extend in two directions to form the grid-like structure. In particular, a plurality of through-slots in each instance extend parallel to one another in each of the two directions perpendicular to the longitudinal direction of the profile portion. In particular, through-slots which extend in the same direction perpendicular to the longitudinal direction of the profile portion are formed geometrically identical.

In particular, the teeth of the plug-in connection are formed to taper toward free ends, also known as head ends. With respect to the spline, the stiffness of the load introduction element in the connection portion common to the profile portion and load introduction element is reduced in longitudinal direction of the connection portion by geometric steps, namely, by the spline. The end portion of the load introduction element is not formed solid in the region of the spline but rather is reduced by the volume of intermediate spaces between the teeth. In particular, the stiffness of the end portion of the load introduction element in longitudinal direction of the common connection portion is reduced during a tensile loading of the connection portion. A tensile loading of this kind tends to pull the end portion of the profile portion out of the spline in longitudinal direction of the connection portion.

The reason for the reduction in stiffness of the load introduction element in longitudinal direction of the common connection portion is that the teeth of the spline are more likely to undergo an elastic elongation in longitudinal direction of the connection portion under a tensile load than would be the case in a solid construction of the end portion of the load introduction element. In particular, the teeth have a length that is substantially at least twice as long as a maximum width of the teeth so that there results a relatively high elastic ductility of the spline in longitudinal direction of the common connection portion during a tensile load as well as during a compressive load. A reduction in the stresses occurring inside the adhesive layer can be achieved, particularly during a tensile loading of the chassis link, through the relatively thinly formed teeth. In particular, the teeth are formed in one piece with the load introduction element.

The teeth of the spline that are not traversed by the neutral fiber plane are advantageously formed at least partially asymmetrically with respect to planes which extend parallel to the neutral fiber plane and, at the same time, through tooth centers of the teeth. A uniform loading inside of the adhesive connection can be achieved through the asymmetrical formation of the above-mentioned teeth and, in particular, also through an asymmetrical formation of the longitudinal adhesive layers which is brought about in this way. The specific configuration of the teeth depends on the local loads in the region of the teeth under load, particularly under a tensile load. Therefore, as a result of the at least partial asymmetrical configuration of the teeth, a uniform stress distribution is achieved within the adhesive connection and, as a result of a prevention of stress peaks, a higher loadability of the chassis link is achieved. In particular, all of the teeth which are not traversed by the neutral fiber plane are formed asymmetrically with respect to planes which extend parallel to the neutral fiber plane and through tooth centers of the teeth simultaneously.

Through-slots that extend perpendicular to the longitudinal direction of the profile portion and which at least partially intersect and penetrate the end portion of the load introduction element in a grid-like manner advantageously have a constant width in a first direction perpendicular to the longitudinal direction of the profile portion and a varying width in a second direction extending perpendicular to the first direction. In particular, the load introduction element is advantageously formed as a profile piece, particularly an extruded profile piece, with unmachined outer circumferential surfaces and/or unmachined inner circumferential surfaces which extend in a longitudinal profile direction. This has the advantage that relatively inexpensive bar stock can be used as starting material for the load introduction element. A cold-drawn or rolled profile piece, for example, is also a possible alternative to the extruded profile piece. In this context, outer circumferential surfaces of the profile piece can all be surfaces that are wetted when the profile piece is completely immersed in a water bath, any hollow spaces which may possibly be present having been sealed beforehand. The rest of the surfaces are inner circumferential surfaces when there are hollow spaces present that extend in longitudinal direction of the profile piece. In the context of the present invention, a profile piece is a portion of a continuous profile. In particular, the profile piece has a constant cross-sectional geometry along its longitudinal extension.

The longitudinal adhesive layers are advisably connected at least partially to unmachined surfaces of the load introduction element. In particular, the unmachined surfaces of the load introduction element are extruded, cold-drawn or rolled surfaces. In particular, the unmachined surfaces of the load introduction element are contoured surfaces.

The straight profile portion advantageously has an open profile cross section. Within the meaning of the present application, "open profile cross section" means a profile cross section that encloses at least one hollow space and has an opening for each hollow space. In particular, the profile portion considered in cross section is formed as a profile portion open on two sides. For example, the profile portion can have a double-T cross-sectional area or a double-C cross-sectional area with openings facing away from one another. Beyond this, the straight profile portion considered in cross section can have an open profile cross section and, at the same time, a closed hollow space or a plurality of closed hollow spaces.

According to an alternative configuration, the straight profile portion is formed as a hollow profile portion. In connection with one aspect of the present invention, a "hollow profile portion" is understood as a portion of a continuous profile. The wall thicknesses of the hollow profile portion are dimensioned to be appreciably smaller than its cross section. The wall thicknesses of the hollow profile portion are preferably 10 to 20 percent, particularly 10 to 15 percent, of the outer dimensions of the hollow profile portion when the latter has a cross-sectional geometry which can be circumscribed by a square at least substantially touching outer surfaces. Considered in cross section, the hollow profile portion has at least one hollow space which is formed as a circumferentially closed chamber. In particular, the hollow profile portion has a constant cross-sectional geometry over the longitudinal extension thereof. The hollow profile portion can also be formed at the same time as a profile portion with an open cross section.

According to a further alternative embodiment, the straight profile portion is formed as a multi-chamber profile portion. This means that the profile portion, when considered in cross section, has at least two hollow spaces formed as circumferentially closed chambers. Depending on the geometric layout and the arrangement of the plurality of chambers relative to one another, the area moment of inertia of the profile portion can be increased by a multi-chamber profile portion. This has the result, particularly during a bending load and/or during a torsional load, but also during a compressive load, that higher forces and/or moments can be transmitted. In particular, the multi-chamber profile portion has, in cross section, at least one transverse web by which the plurality of chambers of the multi-chamber profile portion are separated from one another. When the end portion of the profile portion is glued to the end portion of the load introduction element, a transverse web provides additional connection surfaces, which has the effect of equalizing the stress distribution in the adhesive layer. If required, the multi-chamber profile portion can have more than one transverse web.

The load introduction element preferably has an opening oriented perpendicular to the longitudinal direction of the profile portion. The opening can be formed in the manner of a blind hole, for example, for receiving a joint ball of a ball stud of a ball joint. Alternatively, the opening can also be formed as a through-opening, for example, with a cylindrical through-opening for receiving a molecular joint, also referred to as a clamp joint. In particular, a central axis of a through-opening of this kind extends in the neutral fiber plane. In particular, a through-opening of this kind has, perpendicular to the longitudinal direction of the profile portion, a cross-sectional area which is substantially the same size as a square which circumscribes a cross section of the profile portion or which is greater than such a square. In particular, the through-opening has an unmachined inner circumferential surface in the installed state. Alternatively, the load introduction element can have a through-opening which has an unmachined inner circumferential surface in the unfinished state and a machined inner circumferential surface produced by cutting, for example, in the installed state. A steel bushing can be inserted into the through-opening.

BRIEF DESCRIPTION OF THE DRAWINGS

The invention will be described in more detail in the following referring to drawings which merely represent embodiment examples. Like reference numerals designate like, similar or functionally like component parts or elements. The drawings show.

DETAILED DESCRIPTION OF THE PRESENTLY PREFERRED EMBODIMENTS

Figure 1:
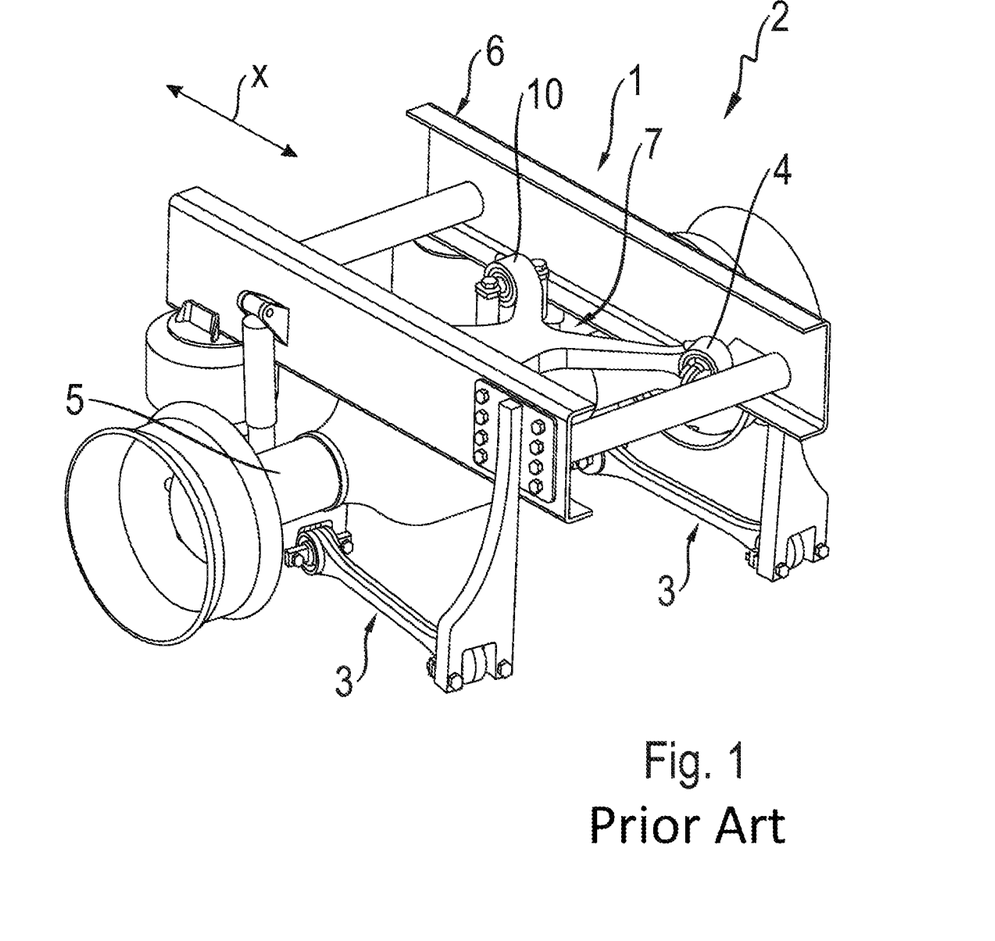
FIG. 1 is a perspective diagram of a chassis arrangement according to the prior art.

FIG. 1 shows a portion of a chassis 1, which is a component part of a motor vehicle, in the present case, of a utility vehicle 2. The chassis 1 has two chassis links 3 arranged in a lower link plane and formed as axle struts. The two axle struts 3 are connected by one end, respectively, to a vehicle axle formed as a rigid axle 5 by a molecular joint. The axle struts 3 are connected by the other end indirectly to a vehicle frame 6 likewise by a molecular joint. Beside the two axle struts 3, the rigid axle 5 is guided through a four-point link 7 arranged in an upper link plane and is substantially X-shaped. The four-point link 7 combines the functions of a three-point link and a separate roll stabilizer in one component part. The four-point link 7 is connected to the vehicle frame 6 in a frame-side bearing area 4 through two molecular joints and to the rigid axle 5 in an axle-side bearing area 10 through two molecular joints. Two of the total of four molecular joints are covered by a side member of the vehicle frame 6.

Figure 2:
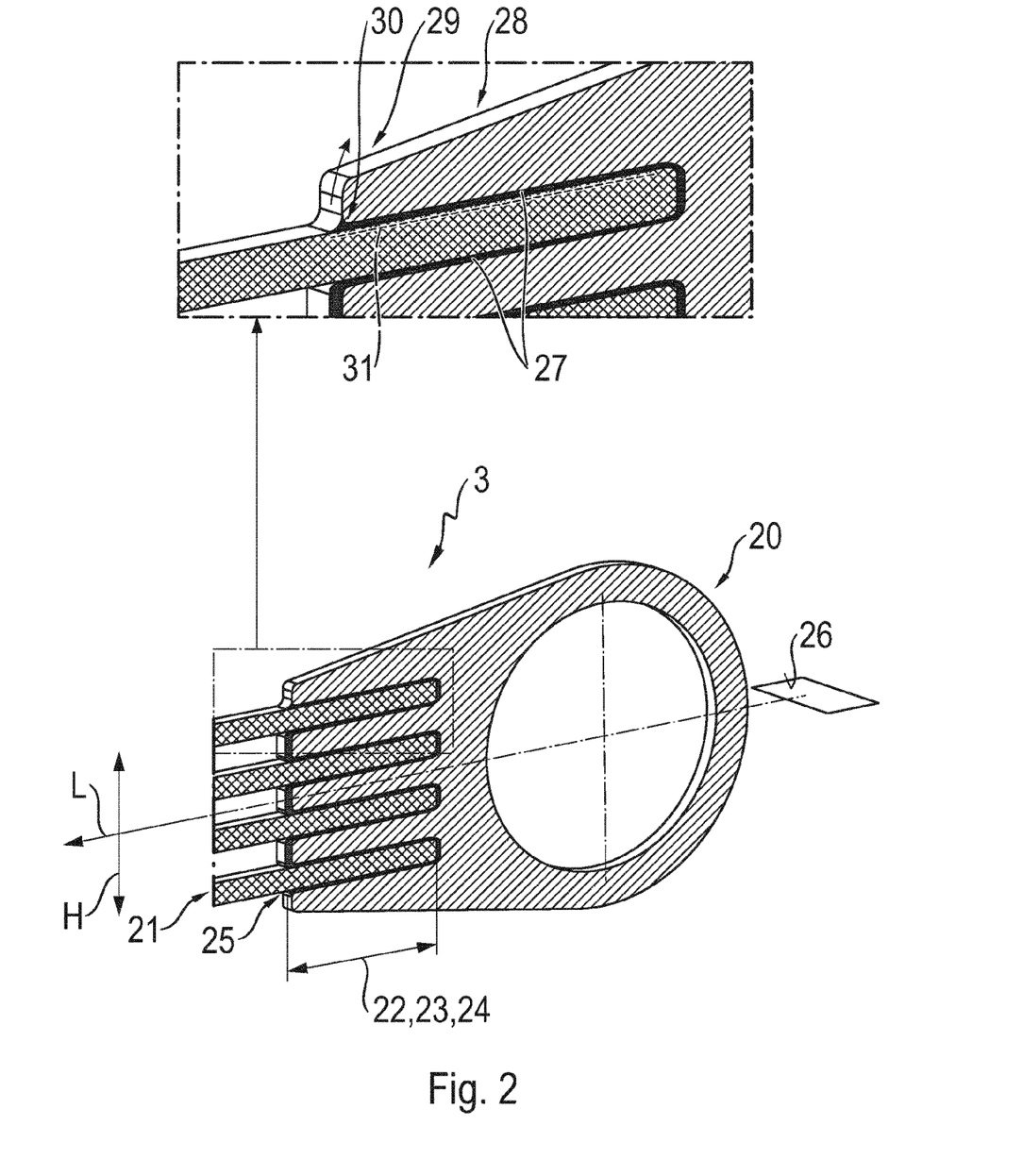
FIG. 2 is a perspective sectional view of a part of a chassis link, not associated with the invention.

FIG. 2 shows a portion of a chassis link 3 not associated with the invention to illustrate the set of problems on which the invention is based. The chassis link formed as an axle strut 3 has a load introduction element 20 made from an aluminum alloy and fixedly connected to a straight profile portion 21 comprising a fiber-reinforced plastic. The profile portion 21 and the load introduction element 20 are connected to one another by material bond via an adhesive connection 25 in a common connection portion 22 in which an end portion 23 of the load introduction element 20 and an end portion 24 of the profile portion 21 engage in one another mutually and substantially by positive engagement. The adhesive connection 25 has, on both sides of a neutral fiber plane 26 of the profile portion 21, a plurality of longitudinal adhesive layers 27 which are, in themselves, planar and of identical length and which extend in a longitudinal direction L of the profile portion 21 and are spaced apart parallel to one another at the same time in a vertical direction H of the profile portion 21 extending perpendicular to the longitudinal direction L. As is conventional in the prior art, all of the longitudinal adhesive layers 27 have a constant thickness of, in this instance, 0.2 millimeters over their longitudinal extension in longitudinal direction L of the profile portion 21.

Analyses have shown that a local stress peak 30 occurs during a tensile loading of the axle strut 3 in the outer longitudinal adhesive layer 27 in the region of a free end 29 of an outer tooth 28 of the load introduction element 20, which outer tooth 28 partially covers the end portion 24 of the profile portion 21. This local stress peak 30 causes a deformation of the free end 29—also known as head end—of the outer tooth 28 in such a way that the free end 29 bends toward the outside of the profile (indicated by an arrow). This bending in turn causes peel loading inside of the adhesive connection 25. However, the outer longitudinal adhesive layer 27 does not fail; rather, a longitudinal crack 31 results close to the surface inside of the straight profile portion 21 of fiber-reinforced plastic, this longitudinal crack 31 extending in longitudinal direction L of the profile portion 21 parallel to the longitudinal adhesive layer 27, which is indicated by dashes. Accordingly, the connection of the profile portion 21 to the metal load introduction element 20 made from an aluminum alloy is lost in the area of the longitudinal crack 31. Since a transmission of force is no longer possible in the area of the longitudinal crack 31, the transmission of force is shifted to other regions of the adhesive connection 25 when the tensile loading of the axle strut 3 ceases. However, these other regions are not designed for receiving additional loads, which ultimately leads to a complete failure of the adhesive connection 25.

Figure 3:
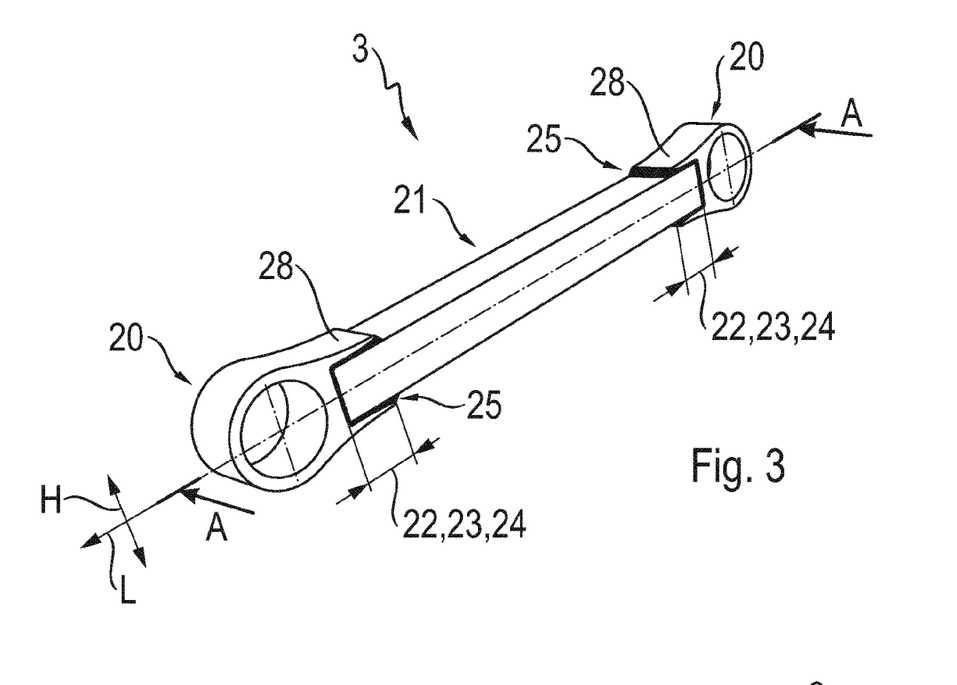
FIG. 3 is a perspective diagram of a chassis link according to the invention.

FIG. 3 shows a chassis link 3 for a utility vehicle 2. The chassis link is formed as an axle strut 3 with two aluminum load introduction elements 20 arranged at the end in each instance. The load introduction elements 20 are fixedly connected to one another by a straight profile portion 21 made from fiber-reinforced plastic. The straight profile portion 21 and the load introduction element 20 are connected to one another via an adhesive connection 25 in a common connection portion 22 in which an end portion 23 of the load introduction element 20 and an end portion 24 of the profile portion 21 engage in one another mutually and substantially in positive engagement. The two common connection portions 22, the two end portions 23 of the two load introduction elements 20, and the two end portions 24 of the profile portion 21 extend, respectively, in a longitudinal direction L of the profile portion 21. In the two common connection portions 22, two outer teeth 28 of the two load introduction elements 20 cover two partial surfaces of the end portions 24 of the profile portion 21, which partial surfaces are, in themselves, planar and are spaced apart parallel to one another in a vertical direction H of the profile portion 21 extending perpendicular to the longitudinal direction L.

Figure 4:
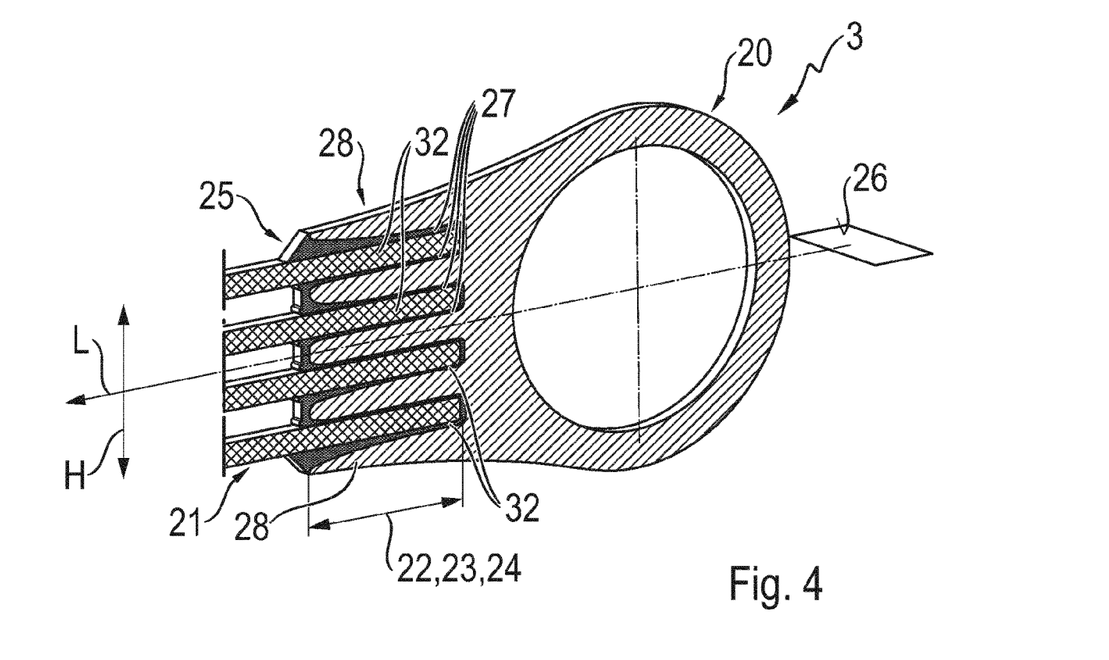
FIG. 4 is a perspective sectional view of a part of the chassis link according to FIG. 3 along section line A-A.

As will be apparent from FIG. 4, the two adhesive connections 25 have, on both sides of a neutral fiber plane 26 of the profile portion 21, four longitudinal adhesive layers 27 which are, in themselves, substantially planar and of identical length in longitudinal direction L of the profile portion 21. The longitudinal adhesive layers 27 are spaced apart parallel to one another in vertical direction H of the profile portion 21. The neutral fiber plane 26 is, at the same time, a symmetry plane with reference to the geometric construction of the axle strut 3. On each side of the neutral fiber plane 26, one of the four longitudinal adhesive layers 27 is arranged in each instance between the above-mentioned outer teeth 28 of the load introduction element 20 and the associated partial surfaces of the end portions 24 of the profile portion 21. These latter longitudinal adhesive layers 27 are outer adhesive layers 32 which are glued to surfaces of the straight profile portion 21 which have a normal vector that extends in the vertical direction H of the profile portion 21 and, at the same time, faces away from the profile portion 21.

These latter outer adhesive layers 32 have an increasing thickness in longitudinal direction L of the profile portion 21 and toward a free end 29 of the outer tooth 28—also referred to as head end—over substantially one half of the tooth length. This is also made possible, inter alia, in that the outer teeth 28 are formed tapered toward their free ends 29. The two adhesive connections 25 have two outer adhesive layers 32 in each instance on both sides of the neutral fiber plane 26 of the profile portion 21. The outer adhesive layers 32 have a cross-sectional area becoming larger with increasing distance from the neutral fiber plane 26 of the profile portion 21. Therefore, the outer adhesive layer 32, which has the greatest distance from the neutral fiber plane 26 has the largest cross-sectional area at the same time. This latter outer adhesive layer 32 has a thickness of approximately 4 millimeters in the region of the free end 29 of the outer tooth 28. The longitudinal adhesive layers 27 are connected to unmachined extruded surfaces of the load introduction element 20. It will be noted with respect to the graphic depiction that only a disk-shaped partial region of the axle strut 3 extending in longitudinal direction L of profile portion 21 is shown in FIG. 4.

Figure 5:
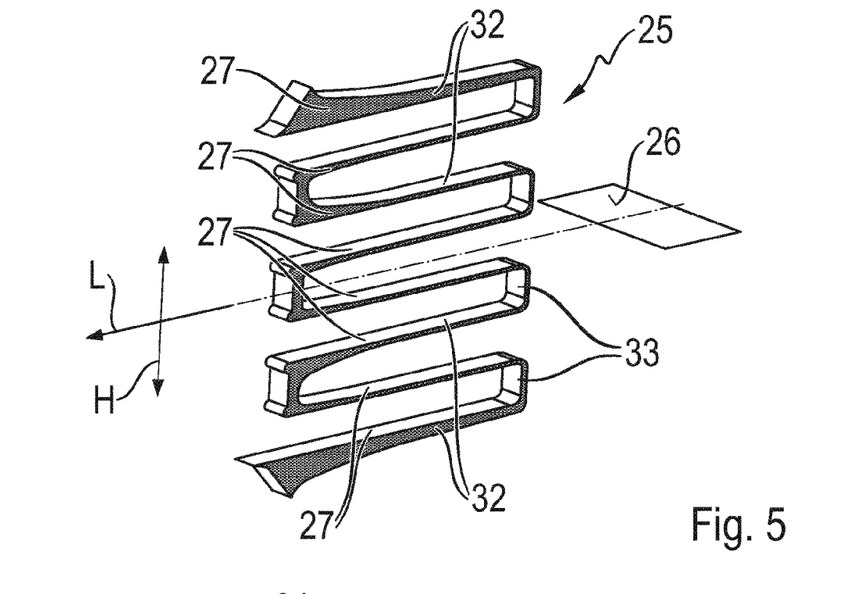
FIG. 5 is a perspective sectional view of adhesive layers according to FIG. 4 shown in isolation.

FIG. 5 shows all of the adhesive layers 27, 32, 33 of the adhesive connection 25 between the end portion 23 of the load introduction element 20 and the end portion 24 of the profile portion 21. It can be clearly seen that all of the longitudinal adhesive layers 27, including the outer adhesive layers 32, are connected to one another by material bond. Transverse adhesive layers 33 which are arranged at the same height in longitudinal direction L of the profile portion 21 and are spaced apart from one another at the same time perpendicular to the longitudinal direction L of the profile portion 21 and, at the same time, extend mainly perpendicular to the longitudinal direction L of the profile portion 21 have an increasing thickness, measured in longitudinal direction L of the profile portion 21, with increasing distance from the neutral fiber plane 26 of the profile portion 21 perpendicular to the longitudinal direction L of the profile portion 21.

Figure 6:
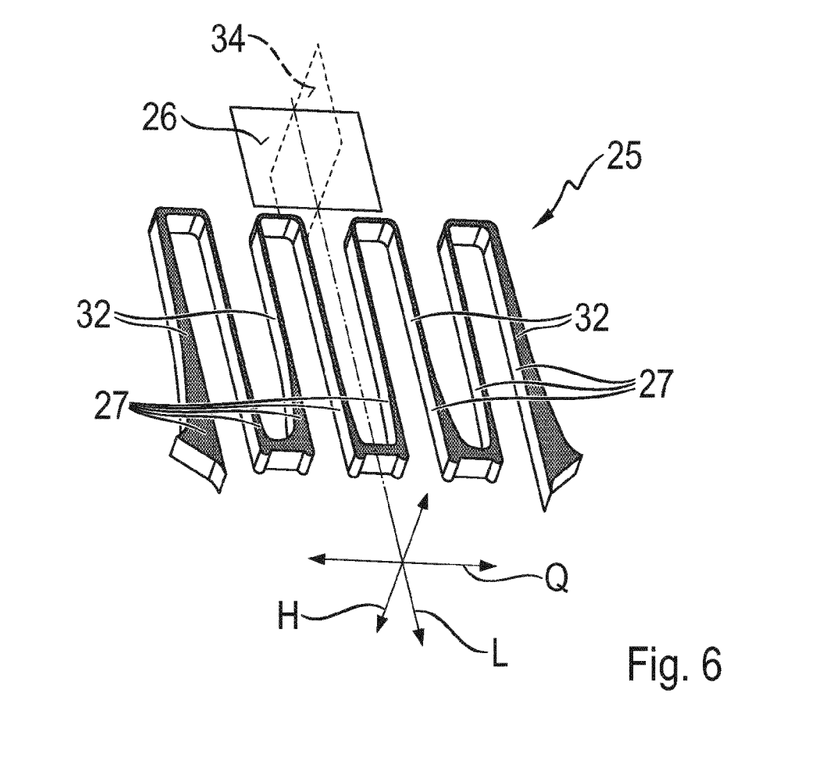
FIG. 6 is a perspective sectional view of adhesive layers according to the invention, shown in isolation.

In a view analogous to FIG. 5, FIG. 6 shows a profile portion 21, not illustrated, having a second neutral fiber plane 34 indicated in dashed lines. The second neutral fiber plane 34 extends in longitudinal direction L of the profile portion 21 and is simultaneously oriented perpendicular to a neutral fiber plane 26 as has already been described. An adhesive connection 25 has four longitudinal adhesive layers 27 on both sides of the second neutral fiber plane 34, which longitudinal adhesive layers 27 are substantially, in themselves, planar and identical in length, extend in longitudinal direction L of profile portion 21 and are spaced apart parallel to one another at the same time in a transverse direction Q of the profile portion 21 perpendicular to the longitudinal direction L and perpendicular to the vertical direction H. On both sides of the second neutral fiber plane 34, two of these longitudinal adhesive layers 27 considered in transverse direction Q of the profile portion 21 have a cross-sectional area becoming larger with increasing distance from the second neutral fiber plane 34 of the profile portion 21. These longitudinal adhesive layers 27 are outer adhesive layers.

Figure 7:
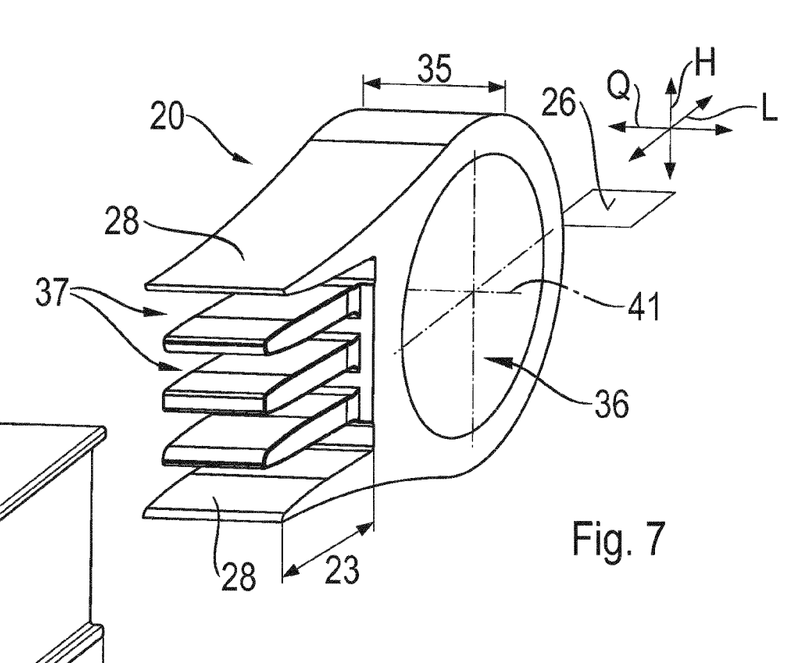
FIG. 7 is a perspective diagram of a load introduction element according to FIG. 3.

The load introduction element 20 shown in FIG. 7 is formed as an extruded profile piece with partially unmachined outer circumferential surfaces and partially unmachined inner circumferential surfaces. The unmachined surfaces extend in a longitudinal profile direction 35. The load introduction element 20 has an opening 36 which is oriented perpendicular to the longitudinal direction L of the straight profile portion 21, not shown, is formed as a through-opening for receiving a molecular joint, also not shown, and has an inner circumferential surface produced by a cutting operation. A central axis 41 of the through-opening 36 extends in the neutral fiber plane 26 and simultaneously in a transverse direction Q which extends perpendicular to the longitudinal direction L and perpendicular to the vertical direction H of the profile portion 21. Perpendicular to the longitudinal direction L of the profile portion 21, the through-opening 36 has a cross-sectional area, which is slightly larger than the surface area of a square circumscribing a cross section of the profile portion 21. The load introduction 20 has four extruded through-slots 37 that extend in longitudinal profile direction 35, which is identical to the transverse direction Q of the straight profile portion 21. The through-slots 37 have along their extension in longitudinal direction L of profile portion 21 a width which varies in vertical direction H of the profile portion 21. In the end portion 23 of the load introduction element 20, a total of five teeth of the load introduction element 20 alternate with the above-mentioned four through-slots 37 in vertical direction H of the profile portion 21. The end portion 23 is included in the vertical direction H by the two outer teeth 28 of the load introduction element 20.

Figure 8:
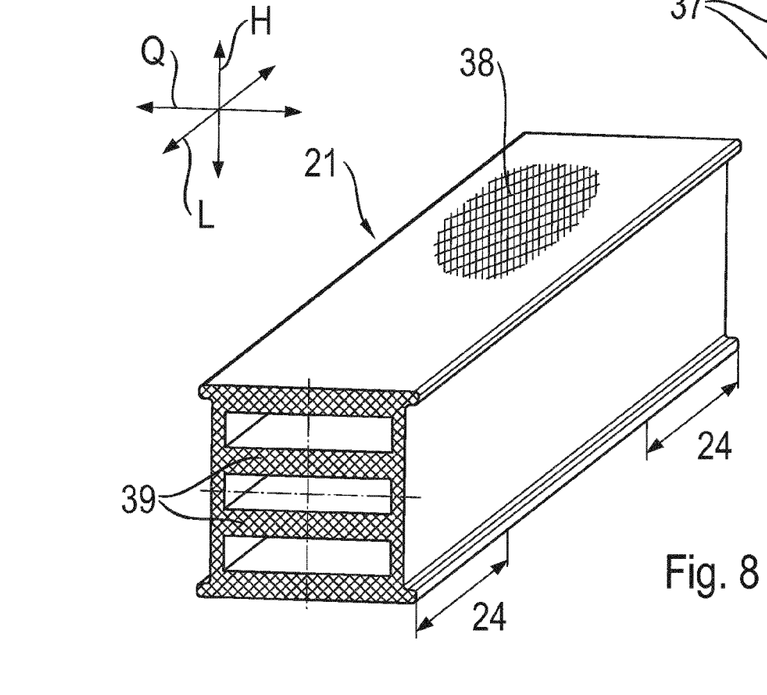
FIG. 8 is a perspective diagram of a profile portion according to FIG. 3.

The profile portion 21 shown in FIG. 8 is formed as a multi-chamber profile with three chambers and has a cover layer 38 made from woven fibers. The cover layer 38 is an outer circumferential surface of the profile portion 21 and extends in longitudinal direction L of the profile portion over the entire length thereof. In cross section, the multi-chamber profile portion 21 has two transverse webs 39 by which three chambers of the multi-chamber profile portion 21 are separated from one another. In the sectional view according to FIG. 4 which shows only a disk-shaped partial region of the axle strut 3, this disk-shaped partial region extends in longitudinal direction L of the multi-chamber profile portion 21 exclusively through the transverse webs 39.

Figure 9:
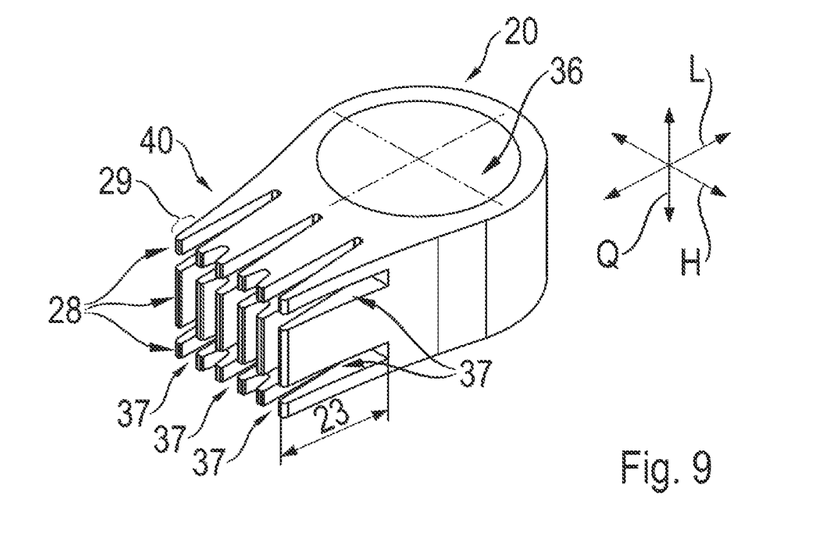
FIG. 9 is a perspective diagram of a load introduction element according to a third embodiment form of the invention.

FIG. 9 shows a load introduction element 20, the end portion 23 of which is penetrated in a grid-like manner by through-slots 37 that extend perpendicular to a longitudinal direction L of a profile portion 21, not shown, and which at least partially intersect at the same time. Accordingly, the end portion 23 of the load introduction element 20 has a spline 40 with teeth extending substantially in longitudinal direction L of the profile portion 21. In a transverse direction Q of the profile portion 21, the spline 40 has three rows of teeth spaced apart in parallel, each row having four teeth. Located at the ends of these three rows of teeth are outer teeth 28, which have a maximum distance from one another in a vertical direction H of the profile portion 21. The outer teeth 28 are formed tapered toward their free ends 29 which are also designated as head ends. The through-slots 37 extending in transverse direction Q are produced by extrusion and have a width which varies in vertical direction H and increases in size toward the free ends 29 of the teeth. The through-slots 37 extending in vertical direction H are produced by cutting machining and have a constant width in transverse direction Q. However, as was described referring to FIG. 6, these latter through-slots 37 can also have a varying width in transverse direction Q, particularly with a width increasing in size toward the free ends 29 of the teeth.

Figure 10A:
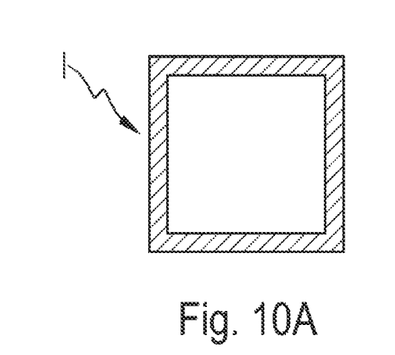
FIGS. 10A-10D are profile portions of the invention in section.
Figure 10B:
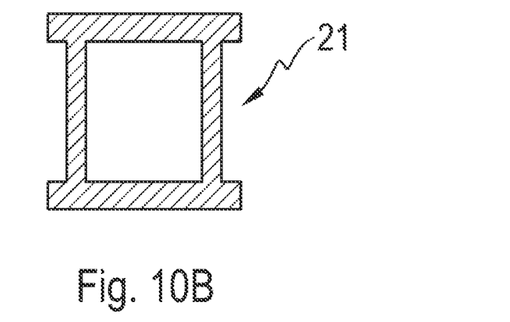
Figure 10C:
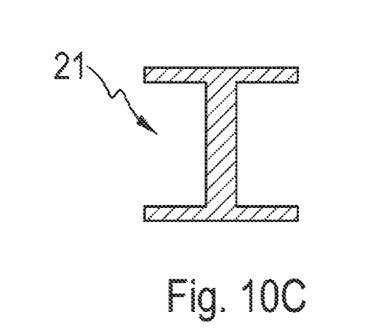
Figure 10D:
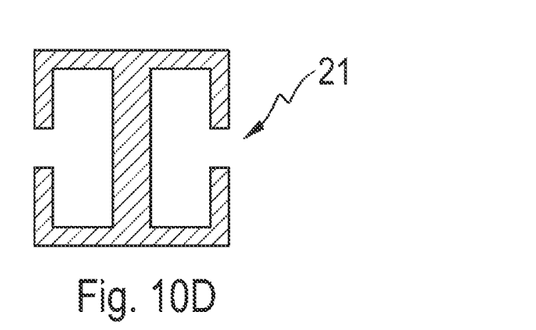

FIG. 10a shows a straight profile portion 21 which is formed as a hollow profile portion. The hollow profile portion 21 is formed as a square pipe. FIG. 10b shows a hollow profile portion 21 with a laterally protruding upper flange and with a laterally protruding lower flange. Profile portions 21 with open profile cross sections are shown with a double-T cross-sectional area in FIG. 10c and with a double-C cross-sectional area in FIG. 10d.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A chassis link for a motor vehicle, comprising:
a straight profile portion comprising a fiber-reinforced plastic;
at least two load introduction elements which are fixedly connected to one another by the straight profile portion;
an adhesive connection via which the profile portion and at least one of the two load introduction elements are connected to one another in a common connection portion in which an end portion of the at least one of the load introduction element and an end portion of the profile portion engage in one another mutually and substantially in positive engagement; and
wherein, on both sides of a neutral fiber plane of the profile portion, the adhesive connection has at least two longitudinal adhesive layers which are at least substantially planar and identical in length and which extend in a longitudinal direction of the profile portion and which are also spaced apart parallel to one another in a vertical direction of the profile portion extending perpendicular to the longitudinal direction,
wherein, considered in vertical direction of the profile portion, on both sides of the neutral fiber plane, the at least two of the longitudinal adhesive layers have a cross-sectional area becoming larger with increasing distance from the neutral fiber plane of the profile portion so that, with respect to a tensile load of the chassis link, a relief is brought about in regions of the adhesive connection which have a relatively large distance from the neutral fiber plane in vertical direction of the profile portion, and
wherein, considered in axial direction of the profile portion, on both sides of the neutral fiber plane, the at least two of the longitudinal adhesive layers have the cross-sectional area becoming larger with increasing distance from each respective axial end of the profile portion.

2. The chassis link according to claim 1, wherein the longitudinal adhesive layers are formed at least partially as outer adhesive layers that are glued to surfaces of the profile portion having a normal vector that extends in the vertical direction of the profile portion and simultaneously faces away from the profile portion, and in that all of these outer adhesive layers have a cross-sectional area becoming larger with increasing distance from the neutral fiber plane of the profile portion.

3. The chassis link according to claim 1, wherein a respective longitudinal adhesive layer which is arranged between an outer circumferential surface of the end portion of the profile portion and an outer tooth of the at least one load introduction element that partially covers the outer circumferential surface has an increasing thickness in longitudinal direction of the profile portion and toward a free end of the outer tooth over substantially one half of a tooth length to prevent a peeling off of the outer tooth from the profile portion under a tensile loading of the chassis link in a region of this longitudinal adhesive layer.

4. The chassis link according to claim 1, wherein the profile portion has a cover layer comprising woven fibers.

5. The chassis link according to claim 1,
wherein the profile portion has a second neutral fiber plane that extends in the longitudinal direction of the profile portion and is oriented perpendicular to the neutral fiber plane,
wherein the adhesive connection has, on both sides of the second neutral fiber plane, at least two longitudinal adhesive layers which are at least substantially planar and identical in length and which extend in the longitudinal direction of the profile portion and are simultaneously spaced apart parallel to one another in a transverse direction of the profile portion extending perpendicular to the longitudinal direction and perpendicular to the vertical direction, and wherein, on both sides of the second neutral fiber plane, at least two of these longitudinal adhesive layers have a cross-sectional area becoming larger with increasing distance from the second neutral fiber plane of the profile portion considered in transverse direction of the profile portion.

6. A chassis link for a motor vehicle, comprising:
a straight profile portion comprising a fiber-reinforced plastic;
at least two load introduction elements which are fixedly connected to one another by the straight profile portion;
an adhesive connection via which the profile portion and at least one of the two load introduction elements are connected to one another in a common connection portion in which an end portion of the at least one of the load introduction element and an end portion of the profile portion engage in one another mutually and substantially in positive engagement; and
wherein, on both sides of a neutral fiber plane of the profile portion, the adhesive connection has at least two longitudinal adhesive layers which are at least substantially planar and identical in length and which extend in a longitudinal direction of the profile portion and which are also spaced apart parallel to one another in a vertical direction of the profile portion extending perpendicular to the longitudinal direction,
wherein, considered in vertical direction of the profile portion, on both sides of the neutral fiber plane, the at least two of the longitudinal adhesive layers have a cross-sectional area becoming larger with increasing distance from the neutral fiber plane of the profile portion so that, with respect to a tensile load of the chassis link, a relief is brought about in regions of the adhesive connection which have a relatively large distance from the neutral fiber plane in vertical direction of the profile portion,
wherein transverse adhesive layers which are arranged at a same height in the longitudinal direction of the profile portion and are spaced apart from one another perpendicular to the longitudinal direction of the profile portion and extend mainly perpendicular to the longitudinal direction of the profile portion also at least partially have, perpendicular to the longitudinal direction of the profile portion, a thickness that increases measured in the longitudinal direction of the profile portion with increasing distance from the neutral fiber plane of the profile portion.

7. The chassis link according to claim 1, wherein the longitudinal adhesive layers are at least partially connected to one another by material bond.

8. The chassis link according to claim 1, wherein the end portion of the at least one load introduction element is penetrated in a grid-like manner by through-slots that extend perpendicular to the longitudinal direction of the profile portion and which at least partially intersect at the same time, so that the end portion of the at least one load introduction element has a spline with teeth extending at least substantially in the longitudinal direction of the profile portion.

9. The chassis link according to claim 8, wherein the teeth of the spline which are not traversed by the neutral fiber plane are formed at least partially asymmetrically with respect to planes that extend parallel to the neutral fiber plane and, at the same time, through tooth centers of the teeth.

10. The chassis link according to claim 1, wherein through-slots that extend perpendicular to the longitudinal direction of the profile portion and which at least partially intersect and penetrate the end portion of the at least one load introduction element in a grid-like manner have a constant width in a first direction perpendicular to the longitudinal direction of the profile portion and a varying width in a second direction extending perpendicular to the first direction.

11. The chassis link according to claim 1, wherein the longitudinal adhesive layers are connected at least partially to unmachined surfaces of a respective load introduction element.

12. The chassis link according to claim 1, wherein the straight profile portion has an open profile cross section.

13. The chassis link according to claim 1, wherein the straight profile portion is formed as a hollow profile portion.

14. The chassis link according to claim 1, wherein the straight profile portion is formed as a multi-chamber profile portion.

15. The chassis link according to claim 1, wherein the at least one load introduction element has an opening which is oriented perpendicular to the longitudinal direction of the profile portion.

* * * * *